US010477840B2

(12) United States Patent
Auffarth (10) Patent No.: US 10,477,840 B2
(45) Date of Patent: Nov. 19, 2019

(54) POULTRY KEEPING FACILITY WITH ADDITIONAL PERCHING RODS

(71) Applicant: BIG DUTCHMAN INTERNATIONAL GMBH, Vechta (DE)

(72) Inventor: Volker Auffarth, Vechta (DE)

(73) Assignee: BIG DUTCHMAN INTERNATIONAL GmbH, Vechta (DE)

(*) Notice: Subject to any disclaimer, the term of this patent is extended or adjusted under 35 U.S.C. 154(b) by 343 days.

(21) Appl. No.: 15/096,327

(22) Filed: Apr. 12, 2016

(65) Prior Publication Data

US 2016/0295840 A1 Oct. 13, 2016

(30) Foreign Application Priority Data

Apr. 13, 2015 (DE) .................... 20 2015 101 803 U (51) Int. Cl.
| A01K 31/12 | (2006.01) |
| A01K 31/14 | (2006.01) |
| A01K 31/22 | (2006.01) |
| A01K 31/04 | (2006.01) |

(52) U.S. Cl.
CPC .............. *A01K 31/14* (2013.01); *A01K 31/04* (2013.01); *A01K 31/12* (2013.01); *A01K 31/22* (2013.01)

(58) Field of Classification Search
CPC ................................. A01K 31/12; A01K 31/14

USPC .......................... 119/329, 336, 346, 531, 534
See application file for complete search history.

(56) References Cited

U.S. PATENT DOCUMENTS

| 1,610,220 A * | 12/1926 | Olson ..................... A01K 31/16 119/531 |
| 1,623,171 A * | 4/1927 | Doser ..................... A01K 31/12 119/531 |
| 2,021,746 A * | 11/1935 | Purnell .................. A01K 31/12 119/443 |
| 2,280,511 A * | 4/1942 | Forsyth .................. A01K 31/12 119/534 |
| 2,728,324 A * | 12/1955 | Radocy .................. A01K 31/16 119/336 |
| 4,640,231 A * | 2/1987 | Turner ................... A01K 29/00 119/842 |
| 5,094,186 A * | 3/1992 | Andersen ............... A01K 31/16 119/337 |

* cited by examiner

*Primary Examiner* — David J Parsley
(74) *Attorney, Agent, or Firm* — Price Heneveld LLP (57) ABSTRACT

The invention relates to a poultry keeping facility comprising at least one nest box, a first colony surface having a perforated first floor area and a second colony surface having a second floor area for spreading litter. According to the invention, a perch facility having at least one perching rod is arranged at a height above the first or second floor area. The perching rod is movable relative to the first or second floor area, wherein the perching rod is movable from a first position to a second position in which the perch facility covers a smaller area of the first or second floor area than in the first position.

19 Claims, 9 Drawing Sheets

POULTRY KEEPING FACILITY WITH ADDITIONAL PERCHING RODS

CROSS-REFERENCE TO FOREIGN PRIORITY APPLICATION

The present application claims the benefit under 35 U.S.C. § 119(b) of German Application No. DE 202015101803.7 filed Apr. 13, 2015, entitled "Poultry Keeping Facility with Additional Perching Rods."

FIELD OF THE INVENTION

The invention relates to a poultry keeping facility comprising at least one nest box, a first colony surface having a perforated first floor area, and a second colony surface having a second floor area for spreading litter.

BACKGROUND OF THE INVENTION

Poultry keeping facilities are typically used for keeping broiler breeders. In this form of poultry farming, the poultry are kept primarily in barns. For that purpose, the poultry keeping facility comprises a nest box for egg laying, which can be arranged in the middle, for example. There are also one or more raised levels which form the first colony surface. These raised levels have a perforated floor area through which the animals' droppings can fall. The floor areas may, for example, be plates having numerous openings. Grids, grates, and the like may also be used here. A suitable facility for removing the droppings may be provided underneath the first floor area, for example, in the form of a droppings belt. Alternatively, some other form of manure removal may be provided, for example one that is manually operated by a person.

In addition to this first floor area, a second floor area forming a second colony surface is provided. This second floor area is typically the barn floor and is designed to receive litter. For that reason, droppings cannot fall through the second floor area, which is used instead to allow the poultry to scratch and peck, behavior that is typical of this species of animal.

A form of poultry keeping which allows species-specific behavior and which prevents species-atypical social behavior among the poultry being kept is made possible, in essence, by the areas thus provided. However, there is a need for further improvement of this form of poultry keeping, one which allows enhanced, species-typical keeping without adversely affecting the efficiency of poultry keeping to any decisive extent.

The object of the disclosure is to provide a poultry keeping facility that allows enhanced, species-specific poultry keeping in accordance with commercial requirements.

This object is achieved, according to the present disclosure, with a poultry keeping facility of the kind initially described, which is developed by providing a perch facility having at least one perching rod arranged at a height above the first or second floor area, said perching rod being movable relative to the first or second floor area, wherein the perching rod is movable from a first position to a second position in which the perch facility covers a smaller area of the first or second floor area than in the first position.

SUMMARY OF THE INVENTION

The improvement herein sets out from the fact that poultry, such as hens, look for areas higher up before roosting. When looking for a perch on which to roost, the animals show a preference for branch-like perches rather than a flat area. The inventors have realized that it would therefore be desirable to provide such perches for enhanced, species-specific poultry keeping. However, one disadvantage that has been identified by the inventors is that such perches reduce the amount of space available in the colony areas within the poultry keeping facility. This problem is overcome, according to the present disclosure, by providing a perch facility which can be moved from a first into a second position. In the first position, which could also be called the lowered or extended position, an area of the poultry keeping facility is covered by the perch facility and is limited as a result in the extent to which it can be used. In this first position, the poultry have the opportunity to sit on the perch facility on one or more perching rods and can therefore adopt a species-specific perching position for roosting, for example. In the second position, the perch facility is moved in such a way that a smaller area of the poultry keeping facility is covered and no longer available for use. In this second position, which could also be called the retracted position, the poultry can therefore enter a colony surface located underneath the perch facility, which they are unable to enter when the latter is in the first position because the surface is covered by the perch facility. In the second position, however, the poultry cannot use the perching rods of the perch facility, or at least not all of the perching rods of the perch facility, that is to say, in the second position the poultry have a limited or non-existent opportunity to take to the perching rods of the perch facility.

According to the present disclosure, a poultry keeping facility is thus provided which allows the poultry to behave in a species-specific manner during the day and at night, in that the perch facility can be moved into the second position during the day, thus providing the poultry with sufficient space inside the poultry keeping facility, whereas the perch facility is moved into the first position at night, thus providing the poultry with a species-specific, branch-like and elevated perching area on the perching rods.

According to a first preferred embodiment, one of the perching rods is arranged on a first frame strut which is movable and in particular is mounted pivotably toward a second frame strut. This development of the present disclosure results in a perch facility construction which provides robust fixing of the perching rods in the first position in which the weight of the poultry is taken up by the perch facility, whereas the design of the perching rods allows them to be moved easily from the first into the second position and vice versa. It should be understood that the perching rod can also be attached to a plurality of first frame struts, each of which are mounted movably to a respective plurality of second frame struts. In that case, the respective sets of first and second frame struts can be matchingly arranged in relation to each other and can be arranged at locations which are spaced apart from each other in the longitudinal direction of the perching rod, so that the perching rod is supported and guided at several points. A frame strut is to be understood in this case as any kind of holding member that takes up a force resulting from the weight of the perching rod, the weight of the poultry perched thereon, and/or from forces resulting from the movement of the perch facility.

It is still further preferred that the second frame strut has fixing means for fixing the second frame strut in place, a first pivot bearing which connects the first frame strut directly to the second frame strut, and a connecting member which is connected at its first end to the first frame strut and at its second end to the second frame strut. This allows the perch facility to be fixed in position in any region within the poultry keeping facility. For example, the perch facility may preferably be fixed to a barn wall or to a partition wall within a livestock barn, by fixing the second frame strut with a vertical direction of extension to the wall. Another option is to fix the perch facility anywhere within a floor standing area in the poultry keeping facility, by fixing the second frame strut to the floor standing area. Fixing can be done using screws, rivets or other fixing means which are connected accordingly to the second frame strut, for example through appropriate holes or elongate holes or the like in the second frame strut. The first frame strut is pivotably connected to the second frame strut. That connection is direct, that is to say, there is a direct connection between the first and the second frame strut by means of a respective connecting means that allows pivotability. The movement of the first frame strut relative to the second frame strut is not restricted to purely pivoting motion, but can also be combined with other forms of movement, such as a translational movement, for example, by the direct, pivotable attachment being effected by a fixing element which can perform a translational movement along the first and/or the second frame strut. A connecting member which is connected to the first frame strut and to the second frame is also provided. This connecting member is used to lock the first and/or the second position. In particular, it is possible by means of this connecting member to lock the first position such that the first frame strut is supported or braced by that means against the weight of the perching rods and the poultry perched thereon. The connecting member may be embodied in the form of a strut, a stop member or the like. Said strut can be fixed directly to both frame struts, or directly to one of the two frame struts only, with the connection to the other frame strut being in the form of a stop face.

It is further preferred that the connecting member be designed as an articulated arm and is pivotably attached to the first and the second frame strut. Embodying the connecting member as an articulated arm allows the first frame strut to be supported against the second frame strut in a manner that is robust and insensitive to dust and dirt. An articulated arm is to be understood here as a strut or strut arrangement which is directly connected to the first strut and the second strut by articulated joints, with this direct connection allowing a pivoting movement of the strut or strut arrangement relative to the first and/or second frame strut, respectively. This pivoting movement may be combined, in turn, with other movements, for example, with translational movements between the articulated arm and the first or second frame strut. More particularly, a strut arrangement in the form of an articulated arm may be a combination of two struts which are pivotably coupled to each other. Such a strut arrangement in the form of an articulated arm allows advantageous movement of the first frame strut relative to the second frame strut, from the first into the second position and vice versa, in that the effective length of the articulated arm is shortened or lengthened by the pivoting action between the two struts.

It is further preferred that the perch facility in the mounted position is movable by gravity actuation from the second to the first position. This embodiment allows the perch facility to be of cost-efficient and simple construction, so that it can fall by the force of gravity into the first position. It should be understood in this regard that it is not necessary for the entire path of movement from the second into the first position to be supported by gravity. Parts of that path can also be effected by the action of other forces, for example with the support of a spring.

It is still further preferred when a securing strut is provided which locks the perch facility in the first position against any further gravity-actuated movement. Gravity-actuated movement from the second into the first position often results in undesired, gravity-actuated movement of the perch facility beyond the first position when a connecting member which fixes the perch facility in the first position fails. This undesired, further movement can lead to the animals being injured, especially when poultry are on the perching rods. According to this feature of the disclosure, a securing strut is therefore provided which locks the perch facility so as to prevent such undesired movement of the perch facility. The securing strut can either cause the perch facility to be fixed directly in the first position, or it can also be designed in such a way that it does not intervene unless or until a connecting member fails, with the result that the perch facility moves out of the first position. In this variant, the risk of a slight movement of the perch facility out of the first position as a result of gravity is accepted, and the securing strut then intervenes as a safeguard and prevents any further movement and any resulting risk of injury. The securing strut may be designed in such a way, in particular, that it is fixed to the first or second frame strut and conversely is locked by positive engagement to the second or first frame strut, respectively, by means of a detent mechanism, thus securing its movement.

According to another preferred embodiment, the poultry keeping facility is developed by an actuator means which is coupled to the perch facility to move the perch facility from the first to the second position and vice versa. Such an actuator means, which can be actuated pneumatically, electrically, hydraulically or by manual force, allows convenient operation of the perch facility in order to move it from the first into the second position and vice versa. The actuator means can be coupled to the perch facility in different ways, for example by means of coupling members in the form of bars, chains, belts, toothed belts, ropes, Bowden cables, or the like.

It is particularly preferred in this regard when the actuator means is coupled to the perch facility by means of a slack traction member. Using a slack traction member, for example, a belt, a toothed belt, or the like, to couple the actuator means to the perch facility allows the perch facility to be actuated from the actuator means, with sufficient freedoms regarding placement of the actuator means and the perch facility in the poultry keeping facility. Such a slack traction member can be easily guided, deflected, and attached to the movable parts of the perch facility so as to effect the movement from the first into the second position and vice versa.

It is further preferred that the actuator means includes an electric motor whose output shaft drives a belt roller, onto and off of which a belt that is fixed to the perch facility can be wound. This embodiment allows efficient and robust movement of the perch facility, while at the same time providing sufficient freedom and variability with respect to the arrangement and fixing of the perch facility and the actuator means, so that the improved perch facility can be deployed in poultry keeping facilities of very diverse kinds. The belt roller may be fixed directly and torque-resistantly onto the output shaft of the electric motor. The belt roller can equally well be fixed to a shaft which is driven by the electric motor, and which performs rotation with a higher or lower gear ratio relative to the electric motor.

The poultry keeping facility can be further developed by a control unit which is in signal communication with the actuator means and which is configured to move the perch facility from the second position into the first position in the evening and from the first position into the second position in the morning. By means of such a control unit, which can be embodied in the form of an electronic control unit, in particular, the actuator means can be controlled in accordance with the day/night rhythm of the poultry, so that the perch facility is brought into the appropriate daytime or nighttime position in a species-specific manner.

In particular, the control unit may be configured to perform the movement from the first into the second position and/or vice versa within a period that is not shorter than two seconds and preferably not shorter than five seconds. Adjusting the perch facility over such a predetermined minimum period ensures that adjustment from the first into the second position or vice versa does not involve any risk of injury for the poultry that is on the perching rods or in the area underneath the perch facility. Such slow movement ensures that the perching poultry has enough time to leave the perching rods calmly during the retraction process, when the amount of perching space available deceases as a result.

It is still further preferred that the first and the second frame strut are included in a first set of struts, and that a second set of struts is provided which is arranged in the longitudinal direction of the perching rods and spaced apart from the first set of struts, and which performs a movement of the perch facility identical to that of the first set of struts. This stable support is also provided for long perching rods. It should be understood that two, three or even more sets of struts can be used in this regard, although only one, only two, or some of several sets of struts can be operated by means of an actuator via an appropriate coupling, in order to move the perch facility from the first into the second position and vice versa. In contrast to that, other sets of struts may simply guide the perching rods and keep these perching rods in the first position, supporting them against the weight of the poultry perched on the perching rods.

According to another preferred embodiment, the second frame strut has a first pivot mounting at a first end and is pivotably mounted thereby on a wall section demarcating the colony surface, and the first frame strut is pivotably connected at a first end to the second frame strut, and a second end of the first frame strut can be moved from a lowered position, in which the second end lies on the first or on the second floor area, into a raised position in which the second end is located above and at a distance from the first or second floor area.

It is further preferred that the first frame strut in the raised position stands in a predetermined angular position relative to the second frame strut, due to a stop member between the first and the second frame strut and in the lowered position stands in a different angular position relative to the second frame strut.

Another aspect of the present disclosure concerns a perch facility for a poultry keeping facility, comprising a perching rod, and a first frame strut to which the perching rod is attached, the first frame strut being movable and in particular being mounted pivotably to a second frame strut, and the perching rod being movable from a first position into a second position in which the perch facility covers a smaller surface in the horizontal direction than in the first position. The perch facility thus defined is suitable for use in poultry keeping facilities of various designs and can be used, in particular, to upgrade existing poultry keeping facilities. It should be understood in this regard that this perch facility can be embodied and developed so that it has the previously described advantages, properties, and features of the perch facility that was previously described in connection with the poultry keeping facility.

The inventive perch facility may comprise a plurality of perching rods extending parallel to each other, one or more of said perching rods preferably being attached to the first frame strut and one or more of said perching rods preferably being attached to the connecting member. When the connecting member is an articulated rod consisting of two articulated struts hingedly coupled to each other, at least one perching rod may be attached to each articulated strut. With this development of the present disclosure, a plurality of perching rods are advantageously provided in the first position, thus producing a large number of perches on which the poultry can roost. In the second position, this plurality of perching rods can then be arranged in a space-saving manner and without requiring any significant amount of floor space in the poultry keeping facility.

As regards the advantages, embodiment variants, and embodiment details of the method according to the present disclosure and its possible further developments, reference is made to the description provided herein of the respective features, as will be understood and appreciated by those skilled in the art upon studying the following specification, claims, and appended drawings.

BRIEF DESCRIPTION OF THE DRAWINGS

A preferred embodiment of the present disclosure shall now be described with reference to the Figures, in which.

DETAILED DESCRIPTION OF THE PREFERRED EMBODIMENTS

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
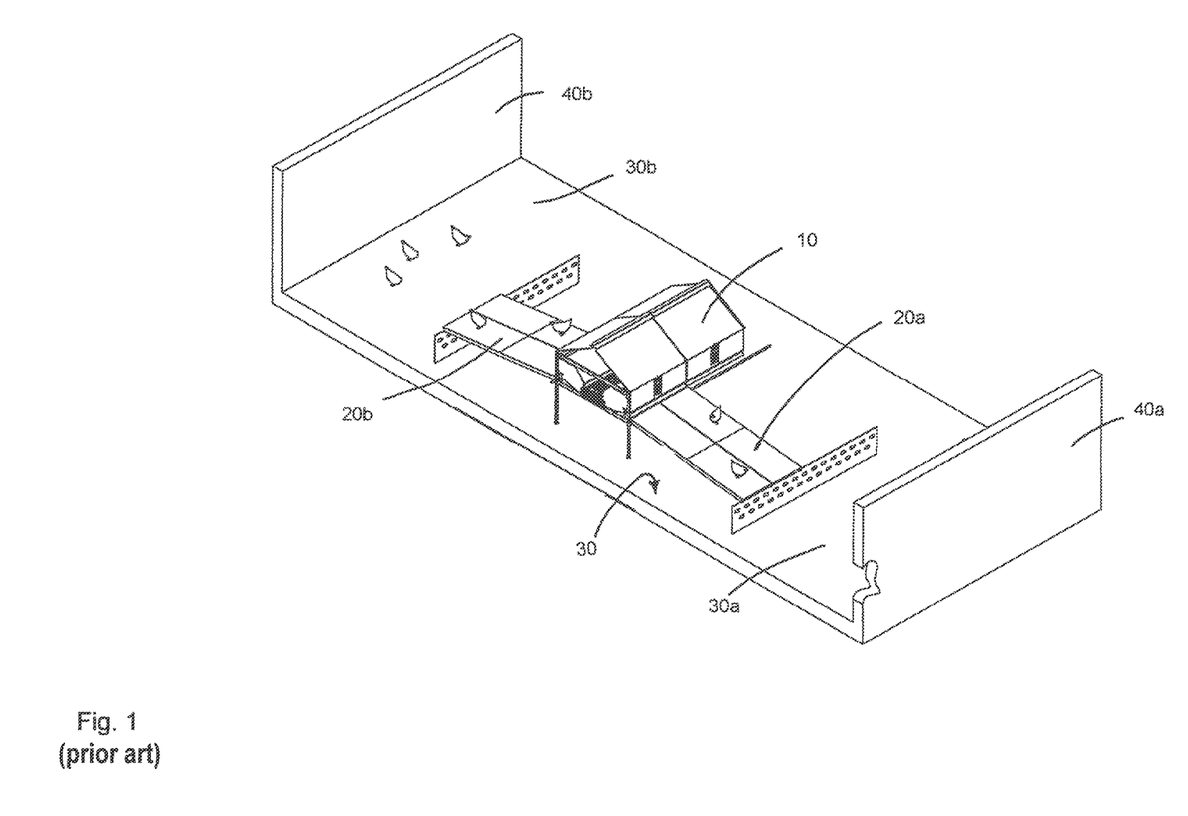
FIG. 1 is a perspective view of a section of a prior art chicken barn.

FIG. 1 shows a section of a chicken barn used for keeping chickens on the floor. A nest facility 10 located in the center and extending in the longitudinal direction of the barn provides a darkened area to which the hens can withdraw to lay their eggs. Nest area 10 can be reached by the hens from both sides via grids 20a, 20b.

Nest facility 10 and grids 20a, 20b are raised from a barn floor 30, so that droppings from the hens can fall into an area underneath nest facility 10 and grids 20a, 20b. No droppings belts or the like are provided in the embodiment shown here, as manual removal of manure is provided. For automatic manure removal purposes, however, conveying devices (not shown), for example, in the form of conveyor belts, can be provided for transporting the falling excrement out of the barn.

Proceedings from the centrally arranged nest facility 10, grids 20a, 20b each extends across about one-quarter of the total barn width, such that a colony surface 30a, 30b is provided for the hens on barn floor 30 between the outer ends of grids 20a, 20b and a barn wall 40a, 40b that demarcates the barn. In this colony area on the barn floor, litter (not shown) is provided for the natural scratching and pecking behavior of the hens.

Figure 2:
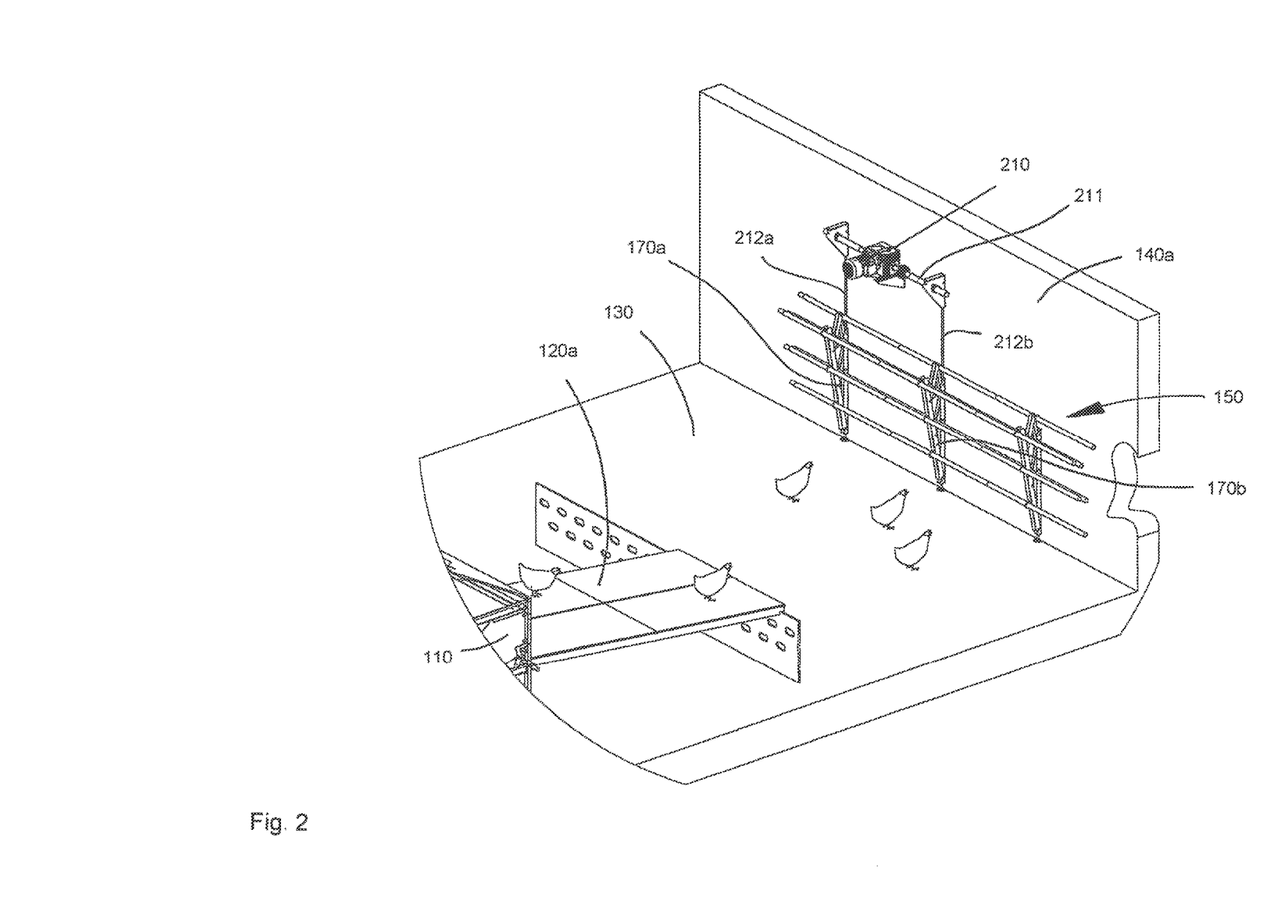
FIG. 2 is a perspective view of a section of a chicken barn according to the present disclosure in the daytime position.

FIG. 2 shows a section of a barn facility according to the present disclosure. A centrally located nest area 110 can be seen, followed by a raised grid 120a extending toward an external wall 140a and across about one-quarter of the entire barn width. Between the outer end of grid 120a and barn wall 140a, a barn floor area is provided for the hens, in which they can scratch and peck in litter.

In the region of this barn floor section 130a, there is a perch facility 150 which is shown in the retracted, daytime position in FIG. 2. Perch facility 150 is fixed to the outer wall 140a by fastening three sets of struts to barn wall 140a, and said sets of struts being connected to a total of six perching rods extending in the longitudinal direction of the barn, parallel to the plane of extension of the nest facility.

Above the perching rods, an electric motor 210 which can wind two belts 212a, 212b in and out via an output shaft 211 is fixed to barn wall 140a. Belts 212a, 212b are arranged at opposite ends of output shaft 211, which is driven approximately in the middle by electric motor 210 by means of an angular gear with gear reduction. Belts 212a, 212b extend downward from shaft 211 and are deflected in the region of the left set of struts 170a and of the middle set of struts 170b to an attachment point. The attachment point is coupled to a movable frame strut, so that the perch facility can be moved out of the retracted daytime position, shown here, and into the extended, nighttime position, shown in FIG. 3, by winding and unwinding belts 212a, 212b.

Figure 3:
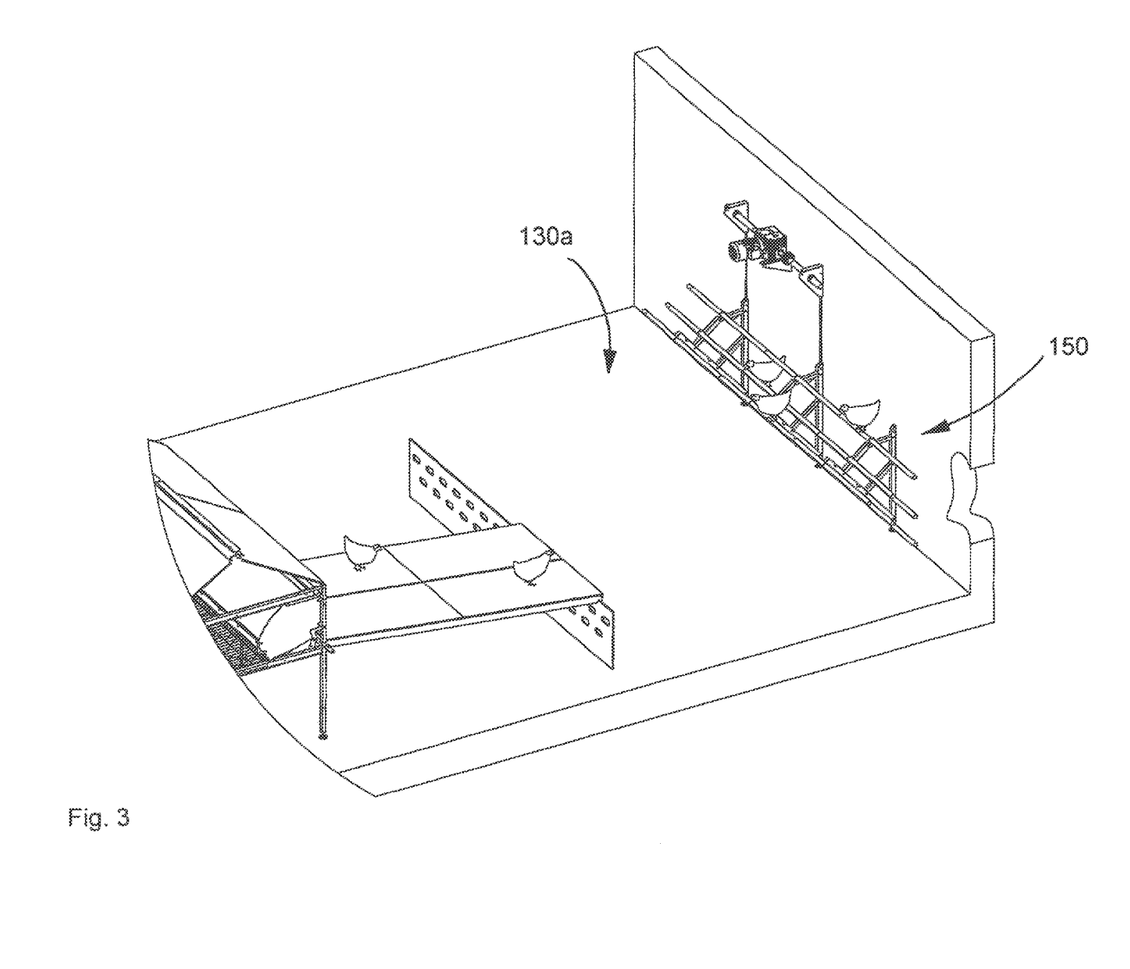
FIG. 3 is a perspective view according to FIG. 2, in the nighttime position.

In FIG. 3, perch facility 150 is provided in a folded out, extended state that is provided for the animals to roost on. The hens can now step onto the perching rods and can perch on them in a raised position relative to the barn floor, which comes close to species-specific perching in a raised position on a branch-like object.

Compared to the retracted position shown in FIG. 2, in which the perch facility does not cover any region of floor 130a and which is made inaccessible for the animals as a result, a region is now provided underneath the perch facility in FIG. 3, such that floor section 130a cannot be used in its entirety by the hens.

Figure 4:
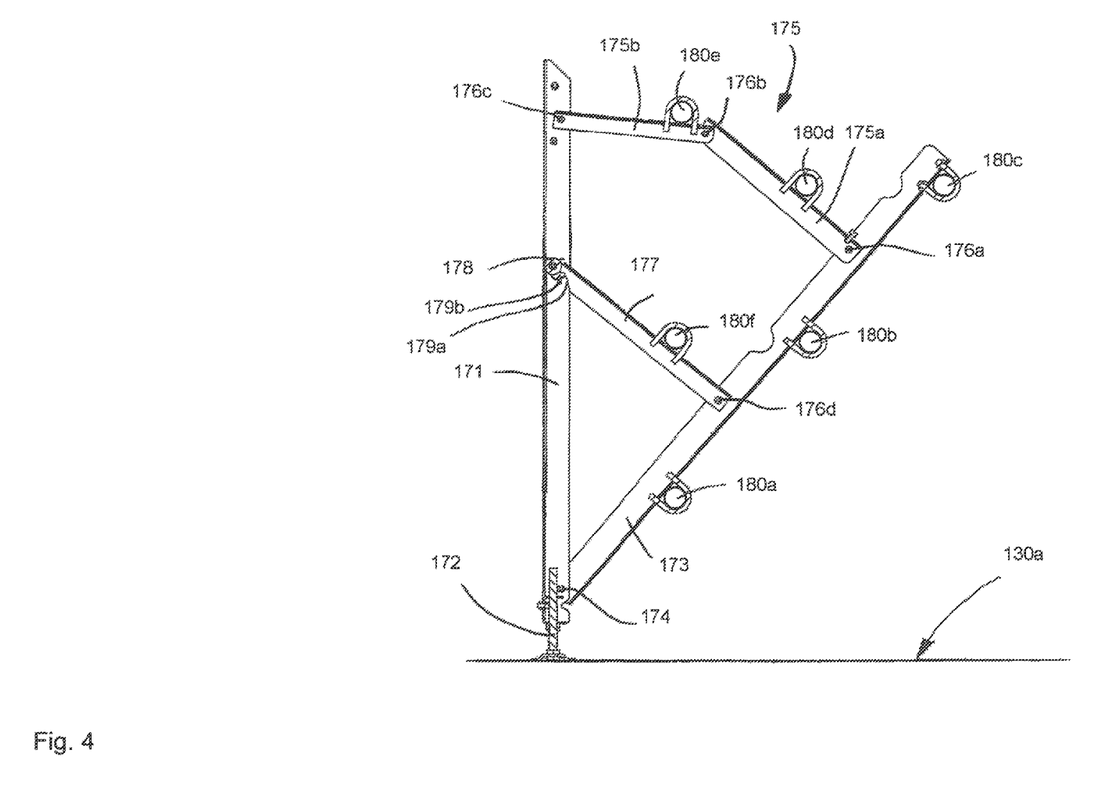
FIG. 4 is a side view of a perch facility according to the present disclosure in the nighttime position.

FIG. 4 shows a side view of the perch facility according to the present disclosure. The perch facility includes a strut 171 which extends in the vertical direction and which can be fastened securely to the barn wall. This wall-mounted strut 171 is additionally supported on the barn floor by a vertically adjustable foot 172, so that the weight of the perch facility and of the hens perched on it can be borne reliably. At the bottom end of wall-mounted strut 171, a frame strut 173 is pivotably fixed by means of a pivot joint 174. In the extended position shown here, frame strut 173 extends upwards at an angle, from said pivot bearing at the bottom end of wall-mounted strut 171. A total of three perching rods 180a, 180b, 180c are attached to frame strut 173. Like wall-mounted strut 171, frame strut 173 is embodied as a U-shaped profile and a longitudinal cross-sectional view of it is shown in FIG. 4.

A double-articulated strut arrangement 175 is fixed to frame strut 173 between the upper perching rod 180c and the middle perching rod 180b. The double-articulated strut arrangement 175 is pivotably connected to frame strut 173 by means of a first articulated joint 176a. From that articulated joint, an articulated arm 175a extends toward another articulated joint 176b where the first articulated arm 175a is hingedly connected to a second articulated arm 175b. Starting from articulated joint 176b with the first articulated arm 175a, this second articulated arm 175b extends as far as wall-mounted profile 171 and is hingedly connected to the latter at the upper end of said wall-mounted profile 171 by an articulated joint 176c.

The double-articulated strut arrangement, consisting of articulated arms 175a, 175b and articulated joints 176a, 176b, 176c form a locking mechanism, which can prevent frame strut 173 from pivoting undesirably beyond the angular position shown in FIG. 4 and further towards the floor 130a. A perching rod 180d, 180e is attached not only to the first articulated arm 175a, but also to the second articulated arm 175b.

Between the middle perching rod 180b and the lower perching rod 180a on frame strut 173 there is a catch arm 177 which is hingedly attached to frame strut 173 by means of an articulated joint 176d. A sixth perching rod 180f is attached to catch arm 177. Catch arm 177 extends toward wall-mounted strut 171 and carries, at the end facing toward wall-mounted strut 171, a guide roller 178 which can roll upward and downward on wall-mounted strut 171 when the perch facility is retracted from the first, extended position shown in FIGS. 2 and 5 to the second position.

There is also a recess 179a in the catch arm at this second end of catch arm 177, said recess being latched, in the position shown, into a fixing element 179b, which is securely connected to wall-mounted strut 171. As a result of this latching between recess 179a and fixing element 179b, which, for example, can be in the form of a screw, a bolt, or the like, frame strut 173 is held by catch arm 177 in the slanting position as shown.

All the perching rods 180a, 180b, 180c, 180d, 180e, and 180f extend parallel to each other in the longitudinal direction of the perch facility and perpendicularly to wall-mounted strut 171, frame strut 173, and the two articulated arms 175a, 175b and to catch arm 177. Articulated joints 174, 176a, 176b, 176c, and 176d each have pivot axes which are spaced apart from each other and which likewise extend parallel to each other. The pivot axes of all the articulated joints run parallel to the longitudinal extension of perching rods 180a, 180b, 180c, 180d, 180e, and 180f.

Figure 5:
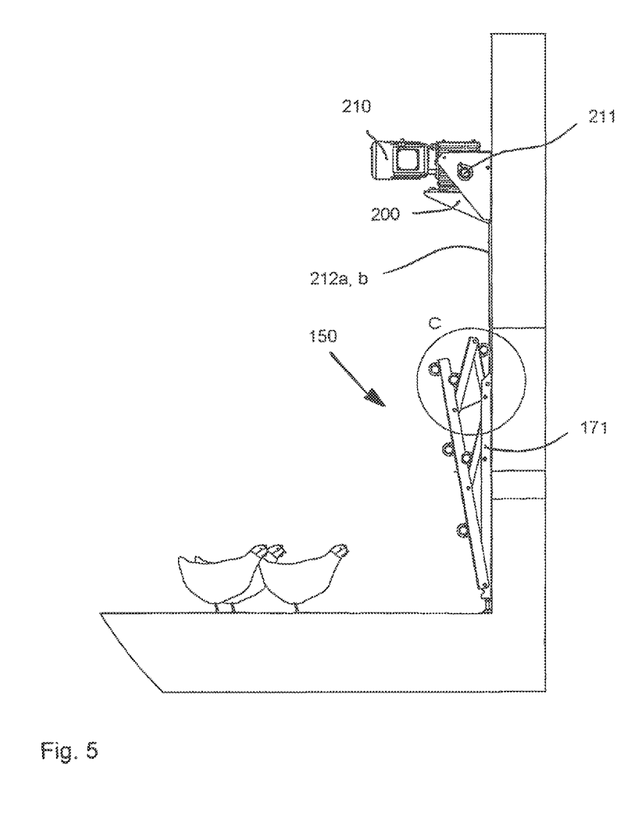
FIG. 5 is a side view of a perch facility according to the present disclosure, installed in position at a sidewall in the daytime position.

FIG. 5 shows perch facility 150 in a retracted position. Above the perching rod, a geared motor 210, which drives output shaft 211, is mounted on the barn wall by means of a mounting bracket 200. The output shaft extends parallel to perching rods 180a, 180b, 180c, 180d, 180e, and 180f. Drive belt 212a, 212b is wound onto and off output shaft 211, depending on the direction in which geared motor 210 rotates. Starting from output shaft 211, drive belt 212a, 212b extends downward in the direction of wall-mounted strut 171.

Figure 6:
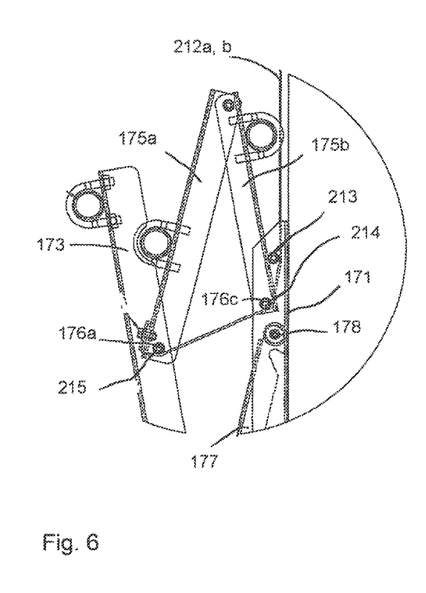
FIG. 6 is an enlarged side view of a section from FIG. 5.

As can be seen in greater detail from FIG. 6, drive belt 212a, 212b is deflected in the region of the upper end of wall-mounted strut 171 by means of a first belt deflection roller 213 and a second belt deflection roller 214 in a direction pointing away from the barn wall and slantingly downward. The second belt deflection roller 214 is coaxial with articulated joint 176c, which pivotably couples the second articulated arm 175b to wall-mounted strut 171.

Starting from the second belt deflection roller 214, drive belt 212a, 212b then extends to a third belt deflection roller 215 which is coaxial and integral with articulated joint 176a, which hingedly connects the first articulated arm 175a to frame strut 173. After that third deflection of the drive belt, the belt is attached to the end of articulated arm 175a facing toward frame strut 173.

Due to this path of the belt, it is possible by tightening the drive belt to move the perch facility from the extended, nighttime position, shown in FIG. 4, into the retracted, daytime position, shown in FIG. 5. Articulated arms 175a, 175b pivot in opposite directions to each other, such that connecting joint 176b between these two articulated arms moves upward. Catch arm 177 is likewise pivoted upward by means of guide roller 178, which runs upward along wall-mounted strut 171.

In the retracted position, shown in FIGS. 5 and 6, the perch facility is held by the drive belt. In the extended position, shown in FIG. 4, the perch facility is held by the catch arm which has locked into position. The drive belt is slackened as a result and does not play a role in locking the perch facility in the extended position and taking up the weight of the perching poultry. In the nighttime position, articulated arms 175a, 175b are arranged with a downward facing articulation angle of less than 180° and can therefore pivot back in one direction only.

In the preferred embodiment, the perch facility is shown mounted on the barn wall and can be accessed by the poultry from the colony surface on barn floor 130a. It should be understood that the perch facility according to the present disclosure can also be arranged elsewhere in the barn facility and can also be accessed by the poultry from the colony surface on grids 120a, 120b, for example.

Figure 7:
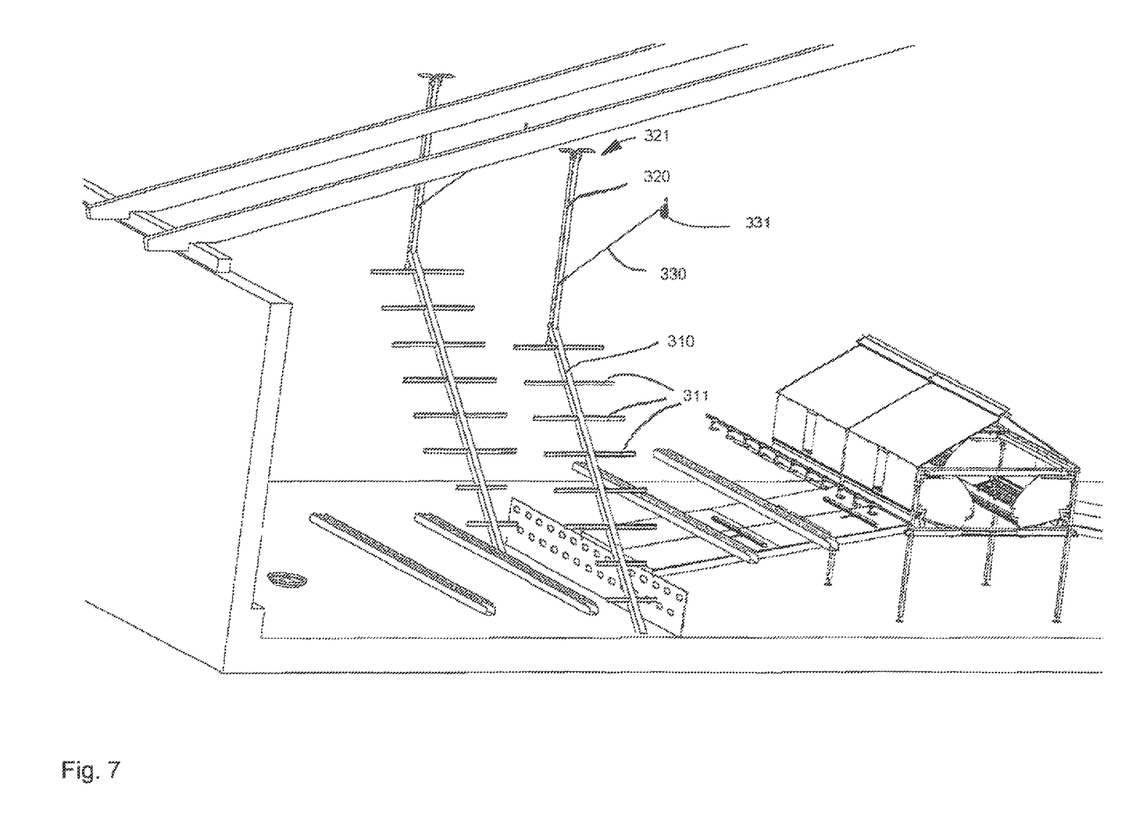
FIG. 7 is a perspective view of a second embodiment of the present disclosure in the nighttime position.

FIG. 7 shows a perspective view of a second embodiment of the present disclosure. In this second embodiment, a second frame strut 320 is pivotably mounted at one end 321 inside the chicken barn, for example, on a sidewall or on the ceiling of the chicken barn. The sidewall can be a gable wall, a longitudinal wall, a partition wall in the middle, or any other partition walls in the poultry barn, and can also be embodied as a wire mesh element or the like. The other end of the second frame strut is hingedly connected to a first frame strut 310. The pivot axes of the hinged connections at the first and second end of the second frame strut 320 are substantially parallel to each other.

When the second frame strut is mounted on a wall, it can rest against the wall when the lowered position is adopted, and the first frame strut stands at an angle to the second frame strut, as can be seen in FIG. 7. If the arrangement of perching rods is fixed to the ceiling or to a suitable ceiling profile or the like, the second frame strut hangs down freely in this position. The other end of the first frame strut from the articulated connection to the second frame strut lies on and is supported by the floor standing area of the poultry barn. A plurality of perching rods 311 are attached to the first frame strut and extend in straight lines from either side of the first frame strut. Hens can sit on these perching rods when they are in the lowered position.

Figure 8:
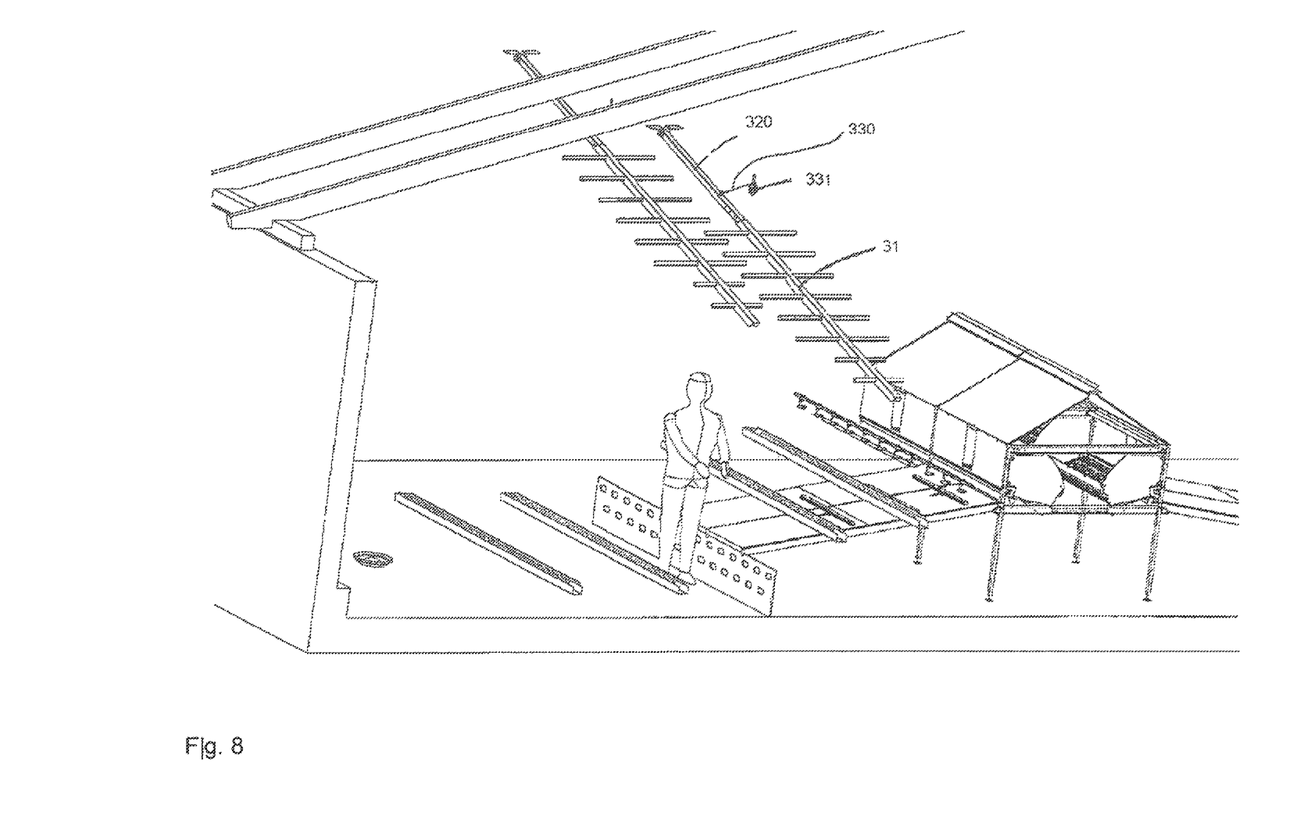
FIG. 8 is a perspective view of the second embodiment in the daytime position.

The second embodiment also allows the perching rod arrangement to be brought into a raised position, as shown in FIG. 8. In this raised position, the second frame strut is raised by a cable pull 330 which is connected to a roller 331. The process of raising the frame strut can be performed, for example, by means of an actuator which drives the roller, or by means of an actuator which pulls in the cable in some other manner and which uses the roller as a deflection roller in that process. Roller or deflection roller 331 can preferably be mounted under and at the barn ceiling or a ceiling strut or the like.

The second frame strut is pivoted in this process out of the position where it rests against the wall or hangs down freely. When a predetermined pivot angle is reached, as in the case of this embodiment where the first and second frame struts are in alignment at an angle of 180° to each other, this angular position between the first and second frame strut is fixed by a stop member and the first frame strut is pivoted and raised together with the second frame strut. This stop member function can be effected, for example, by pivotably attaching the first frame strut to the second frame strut at a distance from the second end of the second frame strut, such that the second end of the second frame strut supports the first frame strut in the angular position of 180° between the two frame struts.

In this alignment with each other, the two frame struts can then be raised together by continuing to hoist the second frame strut until a position is reached where it possible for the poultry barn to be conveniently cleaned.

Figure 9:
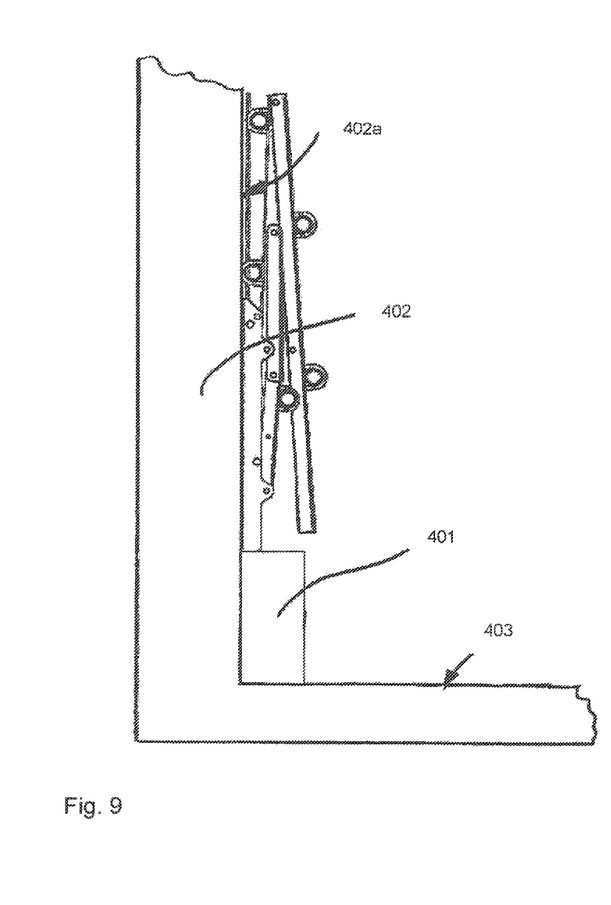
FIG. 9 is a side view of a third embodiment of the present disclosure in the daytime position.

Another embodiment of the present disclosure is shown in FIGS. 9-12. In this embodiment, the perching rod arrangement is mounted on a wall above a base 401. The perching rod arrangement can rest on the top of base 401 or be freely mounted on wall 402. FIG. 9 shows the perching rod arrangement in the folded-up position. In the case of this embodiment, as can be seen, the barn floor can be cleaned with a suitable cleaning tool as far as the base, without coming into contact with the perching rod arrangement and without any risk of damaging the perching rod. The base forms a protruding skirting which protrudes from sidewall 402 in relation to the inner side 402a and which rises a certain height above the floor 403.

Figure 10:
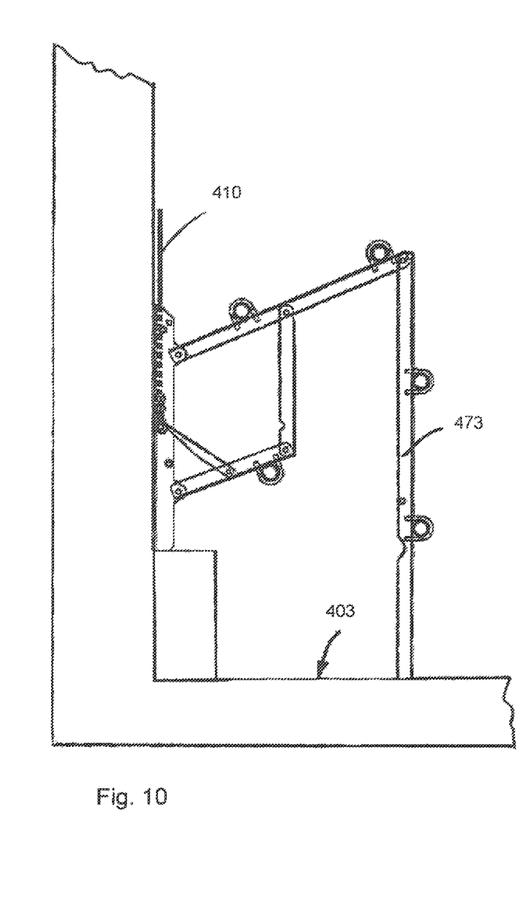
FIG. 10 is a partially extended position of the embodiment according to FIG. 9.
Figure 11:
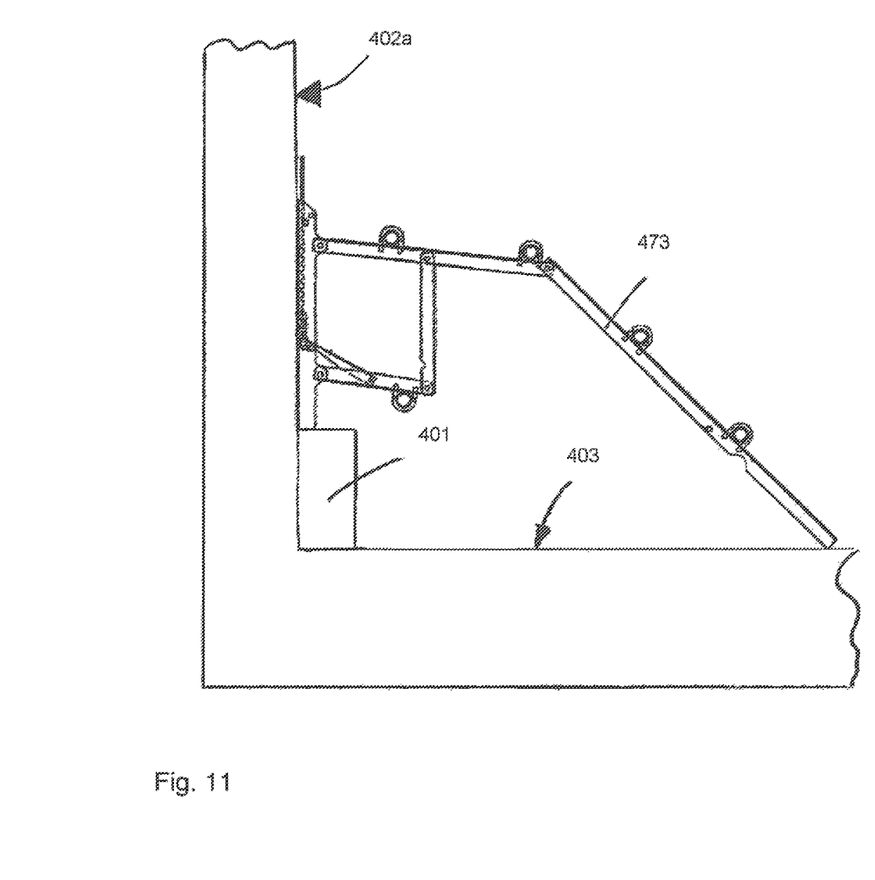
FIG. 11 is an extended position of the embodiment according to FIG. 9 in the nighttime position.

FIG. 10 shows the perching rod arrangement of FIG. 9 in an unfolded position. This is the position that is adopted after extending the perching rod arrangement using a cable pull 410. As can be seen, frame strut 473 rests on floor 403 at its end opposite its articulated attachment, thus providing a relaxed position. From this position, the perching rod arrangement can then be further pivoted manually into the extended position, shown in FIG. 11, in which it offers the additional perches desired for the poultry.

Figure 12:
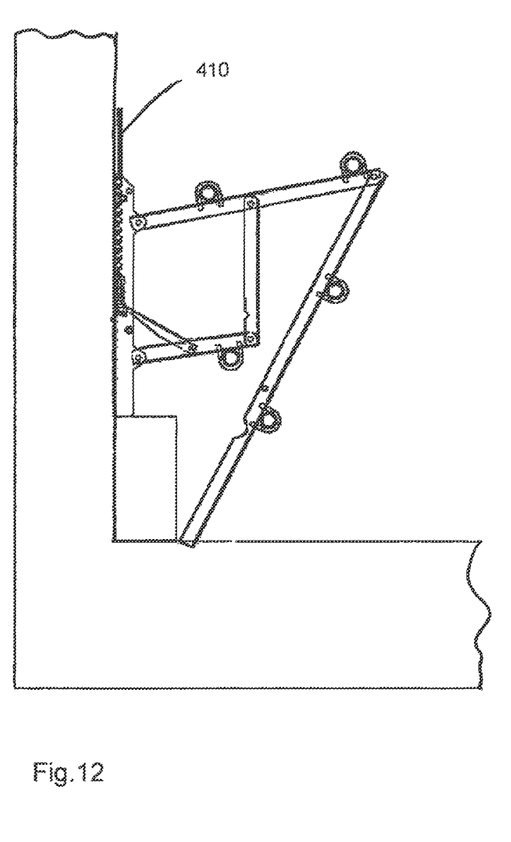
FIG. 12 is a partially retracted position of the embodiment according to FIG. 9.

FIG. 12 shows the perching rod arrangement of FIG. 9 in a manually retracted position. As can be seen, frame strut 473 is manually folded back on itself to such an extent that its end opposite its articulated attachment is propped against the corner between base 401 and floor 403, thus provided a relaxed position. By pulling on cable pull 410, the perching rod arrangement can now be retracted further from this manually retracted position to adopt the retracted position shown in FIG. 9.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A poultry keeping facility comprising:
   at least one nest box;
   a first colony surface having a perforated first floor area;
   a second colony surface having a second floor area for spreading litter;
   an actuator coupled to the perch facility; and
   a control unit in signal communication with the actuator;
   wherein said poultry keeping facility has at least one perching rod arranged at a height above the first or second floor area, said perching rod being movable relative to the first or second floor area by the actuator from a first position to a second position in which the perch facility covers a smaller area of the first or second floor area than in the first position and does not preclude access to the nest box; and
   wherein the control unit is configured to move the perching rod the second position to the first position in the evening and from the first position to the second position in the morning.

2. The poultry keeping facility according to claim 1, wherein the at least one perching rod is arranged on a first frame strut which is pivotably mounted relative a second frame strut.

3. The poultry keeping facility according to claim 2, wherein the second frame strut is pivotably attached to the first frame strut by a first pivot bearing which connects the first frame strut directly to the second frame strut, and wherein the poultry keeping facility further comprises a connecting member connected at a first end to the first frame strut and at a second end to the second frame strut.

4. The poultry keeping facility according to claim 3, wherein the connecting member comprises an articulated arm pivotably attached to the first and the second frame strut.

5. The poultry keeping facility according to claim 3, wherein the at least one perching rod is fixed to the connecting member.

6. The poultry keeping facility according to claim 1, wherein the perching rod in the mounted position is movable by gravity actuation from the second to the first position.

7. The poultry keeping facility according to claim 6, wherein the poultry keeping facility has a securing strut which locks the perching rod in the first position against any further gravity-actuated movement.

8. The poultry keeping facility according to claim 1, wherein the actuator is coupled to the perch facility by means of a slack traction member.

9. The poultry keeping facility according to claim 1, wherein the actuator includes an electric motor whose output shaft drives a belt roller, onto and off of which a belt fixed to the perch facility can be wound.

10. The poultry keeping facility according to claim 1, wherein the control unit is configured to perform the movement from the first into the second position within a period that is not shorter than two seconds.

11. The poultry keeping facility according to claim 1, wherein the control unit is configured to perform the movement from the first into the second position within a period that is not shorter than five seconds.

12. The poultry keeping facility according to claim 1, wherein a first set of struts and a second set of struts is arranged in the longitudinal direction of the perching rods and spaced apart from the first set of struts, and which performs a movement of the perching rods identical to that of the first set of struts.

13. The poultry keeping facility according to claim 1, wherein a second frame strut has a first pivot mounting at a first end pivotably mounted thereby to a wall section demarcating the colony surface, the first frame strut is pivotably connected at a first end to the second frame strut, and a second end of the first frame strut is moveable from a lowered position, in which the second end lies on the first or on the second floor area, to a raised position in which the second end is located above and at a distance from the first or second floor area.

14. The poultry keeping facility according to claim 13, wherein the first frame strut in the raised position stands at a predetermined angular position relative to the second frame strut due to a stop member between the first and the second frame strut and in the lowered position stands in a different angular position relative to the second frame strut.

15. The poultry keeping facility according to claim 1, wherein the perch facility is fixed to a lateral boundary above a base.

16. The poultry keeping facility according to claim 1, wherein the perch facility is directly or indirectly fixed to an aviary ceiling.

17. A perch facility for a poultry keeping facility, comprising:
a perching rod;
a first frame strut to which the perching rod is attached, wherein the first frame strut is pivotably mounted to a second frame strut, and the perching rod is movable from a first position to a second position in which the perch facility covers a smaller surface area in the horizontal direction than in the first position;
an actuator coupled to the perch facility; and
a control unit in signal communication with the actuator and configured to move the perching rod within a period that is not shorter than two seconds from the second position to the first position in the evening and from the first position to the second position in the morning.

18. The perch facility according to claim 17, wherein the second frame strut is pivotably attached to the first frame strut by a first pivot bearing which connects the first frame strut directly to the second frame strut, and wherein the poultry keeping facility further comprises a connecting member connected at a first end to the first frame strut and at a second end to the second frame strut, and wherein the connecting member comprises an articulated arm pivotably attached to the first and the second frame strut.

19. A poultry keeping facility comprising:
at least one nest box;
a first colony surface having a perforated first floor area;
a second colony surface having a second floor area for spreading litter;
an actuator coupled to the perch facility; and
a control unit in signal communication with the actuator;
wherein said poultry keeping facility has at least one perching rod arranged at a height above the first or second floor area, said perching rod being movable relative to the first or second floor area by the actuator from a first position to a second position in which the perch facility covers a smaller area of the first or second floor area than in the first position; and
wherein the control unit is configured to move the perching rod within a period that is not shorter than two seconds from the second position to the first position in the evening and from the first position to the second position in the morning.

* * * * *

UNITED STATES PATENT AND TRADEMARK OFFICE
CERTIFICATE OF CORRECTION

PATENT NO. : 10,477,840 B2
APPLICATION NO. : 15/096327
DATED : November 19, 2019
INVENTOR(S) : Auffarth It is certified that error appears in the above-identified patent and that said Letters Patent is hereby corrected as shown below:

In the Claims

Column 11, Claim 1, Line 58, "the" should be --a--;

Column 12, Claim 1, Line 2, after "rod" insert --from--;

Column 12, Claim 12, Line 47, "is" should be --are--;

Column 14, Claim 18, Line 5, "strut" should be --struts--; and

Column 14, Claim 19, Line 11, "the" should be --a--.

Signed and Sealed this
Twenty-fifth Day of February, 2020

Andrei Iancu
*Director of the United States Patent and Trademark Office*